United States Patent [19]

Taylor, Jr.

[11] Patent Number: 4,709,236

[45] Date of Patent: Nov. 24, 1987

[54] SELECTABLE DOPPLER FILTER FOR RADAR SYSTEMS

[75] Inventor: John W. Taylor, Jr., Baltimore, Md.

[73] Assignee: Westinghouse Electric Corp., Pittsburgh, Pa.

[21] Appl. No.: 731,696

[22] Filed: May 8, 1985

[51] Int. Cl.$^4$ ............................................... G01S 7/66
[52] U.S. Cl. .................................. 342/101; 342/162; 342/195
[58] Field of Search ................ 343/5 CE, 5 CF, 7 A, 343/7.7; 342/93, 159–164, 173–175, 101, 98–100

[56] References Cited

U.S. PATENT DOCUMENTS

| | | | |
|---|---|---|---|
| 3,721,978 | 3/1973 | Doggett, Jr. | 343/7 A |
| 3,761,922 | 9/1973 | Evans | 343/5 DP |
| 3,775,768 | 11/1973 | Lisle et al. | 343/7.7 |
| 3,898,654 | 8/1975 | Vehrs, Jr. | 343/7 A |
| 3,946,382 | 3/1976 | Kossiakoff et al. | 343/5 DP |
| 3,990,076 | 11/1976 | Naidich | 343/7.7 |
| 4,028,697 | 6/1977 | Albanese et al. | 343/5 R |
| 4,339,754 | 7/1982 | Hammers et al. | 343/7.7 |

Primary Examiner—T. H. Tubbesing
Assistant Examiner—Bernarr Earl Gregory
Attorney, Agent, or Firm—R. P. Lenart

[57] ABSTRACT

An arrangement for selecting between different doppler filter pairs having response characteristics optimized for ground clutter or moving rain clutter rejection. The selecting process detects the amplitude and mean doppler of the received radar echoes. The filter which is optimized for rain clutter rejection is normally used until clutter amplitude is detected above a predetermined value and the mean doppler is detected as being equal to or near zero. When such a detection is made, the filter optimized for ground clutter rejection is selected. Portions of the selecting device allow for the selection to be determined over several samples rather than switching the filters in each sample or coherent processing interval. Another portion of the circuitry changes the predetermined values which must be exceeded for a selection of the ground clutter filter, thereby preventing another filter change with only a small change in detected amplitude or mean doppler.

19 Claims, 5 Drawing Figures

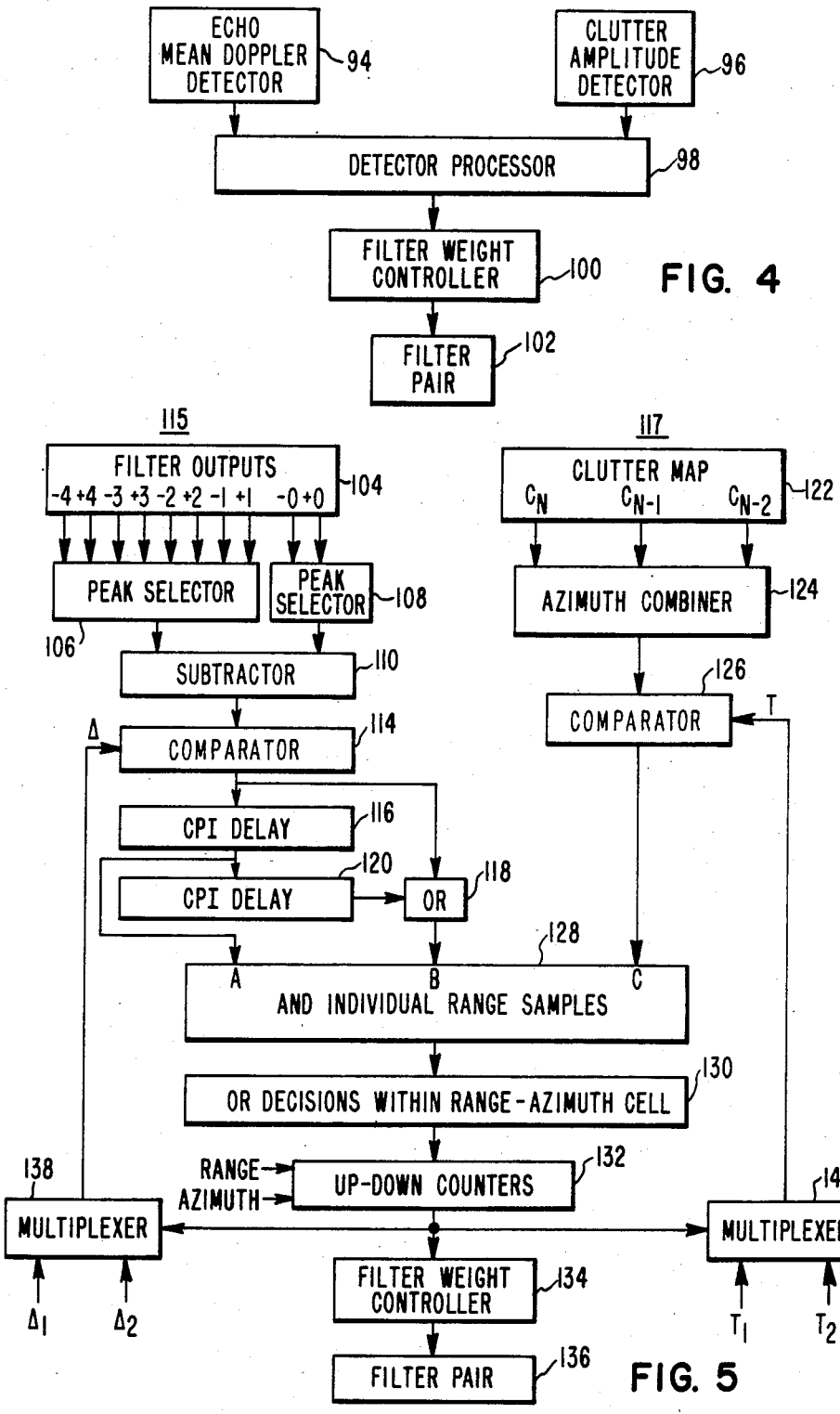

SELECTABLE DOPPLER FILTER FOR RADAR SYSTEMS

BACKGROUND OF THE INVENTION

This invention relates, in general, to radar systems and, more specifically, to radar processors having selectable doppler filters.

The echo processing techniques used with certain radar systems employ doppler filters which ideally should pass a narrow band of frequencies and totally reject all others. However, such an ideal filter is not obtainable. Actual doppler filters are normally implemented by processing a finite number of received signals or echoes in the digital processor of the radar receiver. These actual filters pass the desired narrow band of frequencies but also pass, to some extent, the signals whose frequencies are in the rejection band of the filter. The rejection band includes the signals associated with ground clutter echoes and with other doppler shifted echoes, such as those from moving rain. Both ground clutter and moving rain echoes are considered unwanted interference and tend to degrade the ability of the radar to detect an aircraft echo signal contained within the pass band of the filter.

In order to alleviate this condition, prior radar systems have used digital doppler filters which have been designed to cope with specific levels of the two types of interference. However, both types of interference vary widely, both spatially and temporally. If filters could be designed to handle the highest expected levels of both types of interference of clutter simultaneously, the problem would be greatly reduced. Unfortunately, typical dwell times on the target do not provide a sufficient number of pulses to provide such filters. Therefore, a compromise in filter response has been necessary according to the prior art. Adaptive digital doppler filters have been known in the prior art, but their use has been minimized because of their complexity and because of concern about their ability to maintain clutter suppression capability in the presence of strong moving targets and pulses from other radar systems and electronic counter measures (ECM).

At least one radar system uses a technique for switching between doppler filters wherein, at intervals of five minutes, the target data is interrupted for one scan to determine which filter provides the minimum output in each spatial zone. This selection process causes a loss of data for one scan and makes it difficult to track targets of marginal detection probability which may fade on the preceeding or succeeding scan. Such selection process also has an inability to react to changing rainfall and wind at a given spatial location over a five minute time interval and is susceptible to selecting the wrong filter in those zones where a moving target is detectable.

Several U.S. patents have been issued which teach various arrangements and methods for dealing with filter performance under varying conditions. U.S. Pat. No. 3,775,768, issued Nov. 27, 1973, describes a clutter filter which is adapted to the prevailing signal by changing the notch of the filter according to the measured amplitude and the expected bandwidth of ground clutter signals. U.S. Pat. No. 4,339,754, issued July 13, 1982, describes the selection between two moving target indicator (MTI) systems. Such selection is made by determining the degree of correlation of the echoes. U.S. Pat. No. 3,990,076, issued Nov. 2, 1976, describes a selection process in an angle-tracking radar whereby the echo amplitudes from range bins straddling the target range bin are sensed to determine if either magnitude warrants selecting the doppler filter which attenuates ground clutter. These and other U.S. patents which have been issued and teach changing the response of filters based upon the measurement of certain variables are useful in some situations; however, they all differ significantly from the teachings of the present invention.

To alleviate some of the problems associated with prior art doppler filter selecting arrangements, it is desirable, and it is an object of this invention, to provide an arrangement or device for selecting appropriate doppler filters without losing target data for one scan and for selecting the filter frequently enough to react favorably to clutter changes over a given spatial location.

SUMMARY OF THE INVENTION

There is disclosed herein a new and useful arrangement for selecting between pairs of doppler filters depending upon the characteristics of the received echoes. In the preferred embodiment, there are two choices for the doppler filter pair which passes the lowest target doppler while attenuating ground clutter interference centered on zero doppler. One pair has a response which is better for filtering out heavy ground clutter and moderate moving rain clutter. The other pair has a response which is better for filtering out heavy moving rain clutter and moderate ground clutter. The arrangement or device processes the echo signals to determine both the mean doppler shift of the echoes and their amplitude to determine which filter to select.

According to the preferred embodiment, the mean doppler of the echoes is determined by comparing the peak output values of the zero and non-zero doppler filters from a particular range-azimuth location. When the peak value of a zero filter exceeds the peak value of any non-zero filter by a predetermined amount, the presence of echoes having a mean doppler near zero is detected.

Data from a clutter map is combined to determine the mean amplitude of the low or near zero doppler echoes. When this value exceeds a predetermined value, the presence of a sufficiently high amplitude echo is detected. When the mean doppler and amplitude criteria are met, further processing combines the two and decides if a change in filter characteristics is desirable immediately or after analyzing several samples of data, delayed to include a larger range sample region. Multiplexers are used to add hysteresis to the circuit by changing the two predetermined reference values upon the selection of the other filter. This delays returning to the original filter until the echoes have changed significantly from their previous valves.

BRIEF DESCRIPTION OF THE DRAWINGS

Further advantages and uses of this invention will become more apparent when considered in view of the following detailed description and drawings, in which:

FIG. 4 is a block diagram illustrating the general operation of a selectable doppler filter constructed according to this invention; and FIG. 5 is a block diagram illustrating the detailed arrangement of a selectable doppler filter constructed according to one embodiment of the invention.

DESCRIPTION OF THE PREFERRED EMBODIMENTS

Figure 1:
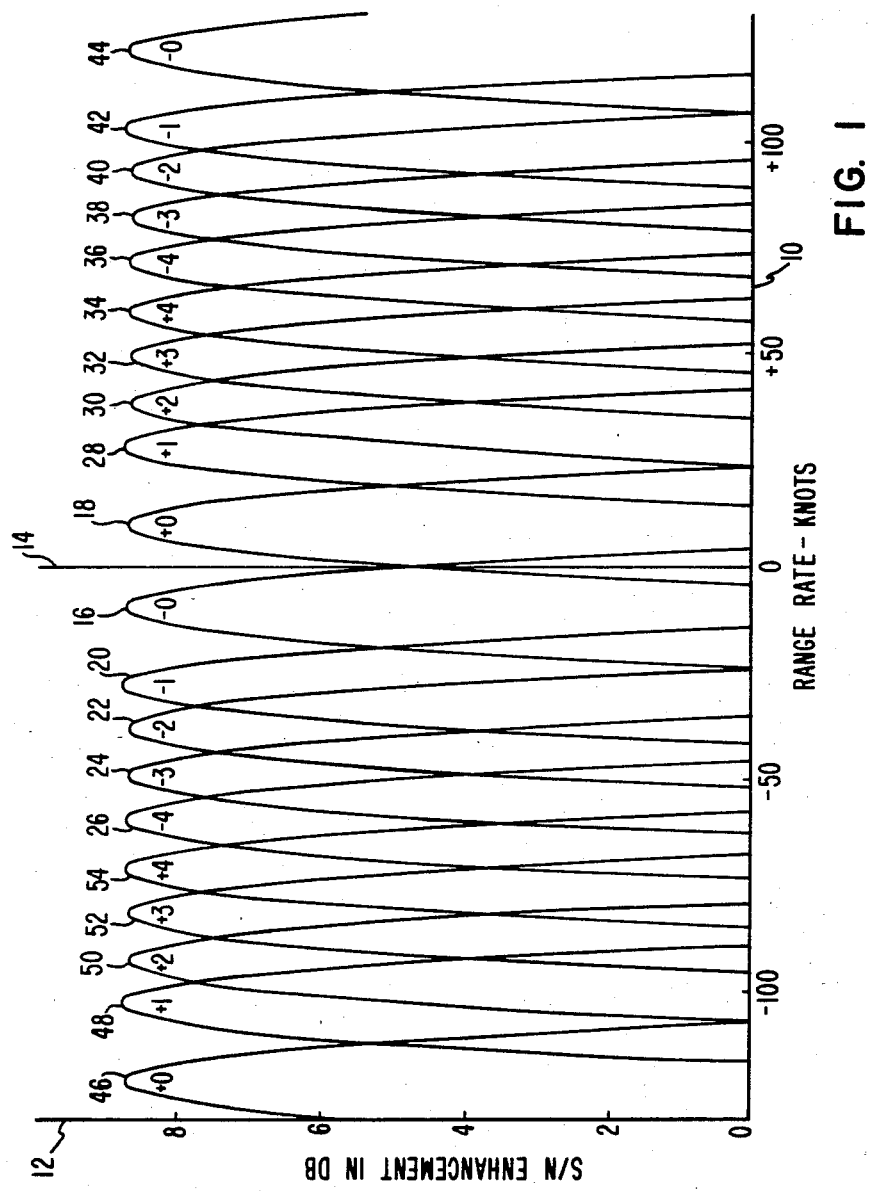
FIG. 1 is a graph depicting the response of a bank of digital doppler filters.

Throughout the following description, similar reference characters refer to similar elements or members in all of the figures of the drawing.

Referring now to the drawing, and to FIG. 1 in particular, there is shown a graph of the response of a bank of doppler filters typical of that found in a pulse doppler radar system. The horizontal axis 10 corresponds to the frequency of the response curves and, in this figure, is given the more conventional values of speed since the frequency shift of the doppler echoes is a function of the radial speed of the target reflecting the echoes. The vertical axis 12 corresponds to the attenuation provided by the filters.

The filter bank shown in FIG. 1 includes several filter pairs which are aligned as mirror images on each side of the zero doppler shift axis 14. Response peaks 16 and 18 correspond to the filter pairs which are normally referred to as the zero filter pair, or zero doppler filter, since they are the closest filters to the zero range rate or doppler shift axis 14 and since their function is to respond to or substantially pass signals having zero or near zero frequency shift. This filter pair is designated as −0 and +0 in FIG. 1, with the sign indicating on which side of the zero axis 14 the filter response is located. Response peaks 20, 22, 24 and 26 correspond to filter pairs designated as −1, −2, −3 and −4, respectively, each positioned with its response peak at different frequencies or speeds from the zero axis 14. In a similar manner, response peaks 28, 30, 32 and 34 correspond to filter pairs designated as +1, +2, +3 and +4, respectively, each positioned on the positive side of the zero axis 14. Since the filters effectively have peaks at other frequencies determined by the pulse repetition frequency (PRF) of the system, peaks 36 through 44 represent the filter response of the negative filters introduced by the PRF of the system. Similarly, peaks 46 through 54 represent the filter response of the positive filters introduced by the system PRF.

The zero filter pair (−0, +0) respond strongly to ground clutter echoes from the radar receiver since the ground clutter echoes have a mean doppler shift of zero and a relatively narrow bandwidth centered around the zero axis 14. Moving targets, whether they be aircraft, birds, moving rain, etc., produce echoes which are shifted in frequency from the transmitted radar signal and are generally passed by one of the non-zero doppler filters (−1, −2, −3, −4, +1, +2, +3 and +4). Aircraft on near-tangential flight paths, or producing a doppler frequency which is close to an integral multiple of the radar PRF, are passed by the zero filter pair. Non-zero doppler filters are characterized by the fact that they substantially reject low doppler signals. Using a bank of doppler filters can provide information on the speed or range rate of the target. In many practical applications, the bank of filters is used to allow one or more filter outputs to be desensitized while leaving the others available for detecting the presence of echoes from moving targets. This would be desirable when some of the filters are receiving clutter echoes and, by desensitizing these filters, proper surveillance of the other filters for more important moving targets can be maintained.

While the response peaks shown in FIG. 1 illustrate a simple one peak response without any adjacent skirt or side lobe response, actual filters have various attenuation characteristics outside the peaks indicated. Thus, non-zero filters still must have some ability to attenuate ground clutter echoes near the zero axis 14 and to attenuate doppler-shifted echoes near the zero axis 14 and to attenuate doppler-shifted echoes not in the main pass band of the particular filter. The first filter pair, or pair 1, which includes filters −1 and +1 represented by peaks 20 and 28, are most susceptible to ground clutter echoes since they are closest to the ground clutter filters −0 and +0. Other non-zero pairs have some susceptibility, but controlling the response of such filter pairs to provide adequate performance is easier because the main passbands are located farther from the ground clutter echoes.

Figure 2:
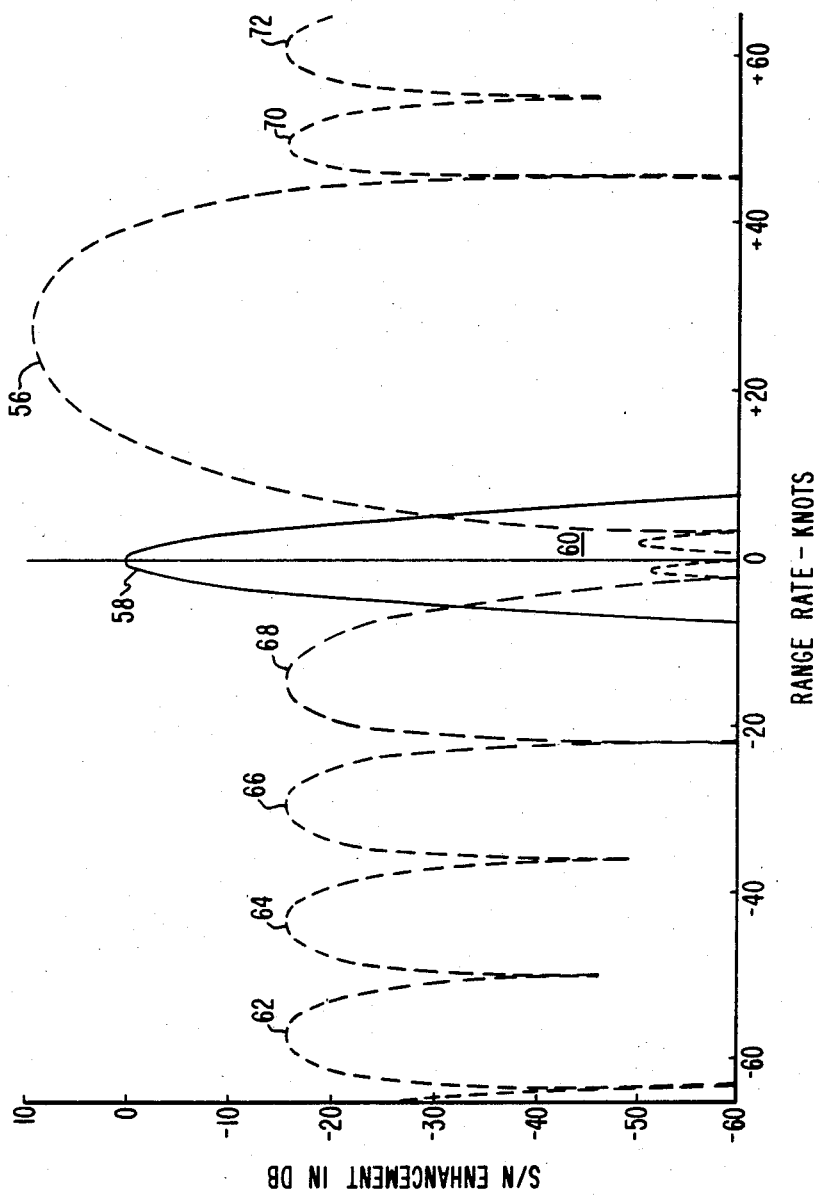
FIG. 2 is a graph depicting the response of one of the doppler filters configured for optimum ground clutter rejection.

FIG. 2 represents the response of filter +1 with the characteristics of the response established to perform best when the radar echoes contain a large amount of stationary ground clutter. Response peak 56 corresponds to the response peak 28 shown in FIG. 1. The notch for the ground clutter signal 58 is provided by the response portion or notch 60 of the overall filter response characteristics. The remaining portion of the filter response illustrated shows that peaks 62, 64, 66, 68, 70 and 72 exist within the rejection band. These peaks ideally should be low to provide maximum attenuation of any rain echoes in that region. However, in actual practice, a good notch of the ground clutter signal 58 is achievable with only moderate filtering in the other areas. Thus, the filter with the response shown in FIG. 2 would be very desirable when heavy ground clutter signals are present in the radar echoes along with only moderate moving rain clutter echoes.

Figure 3:
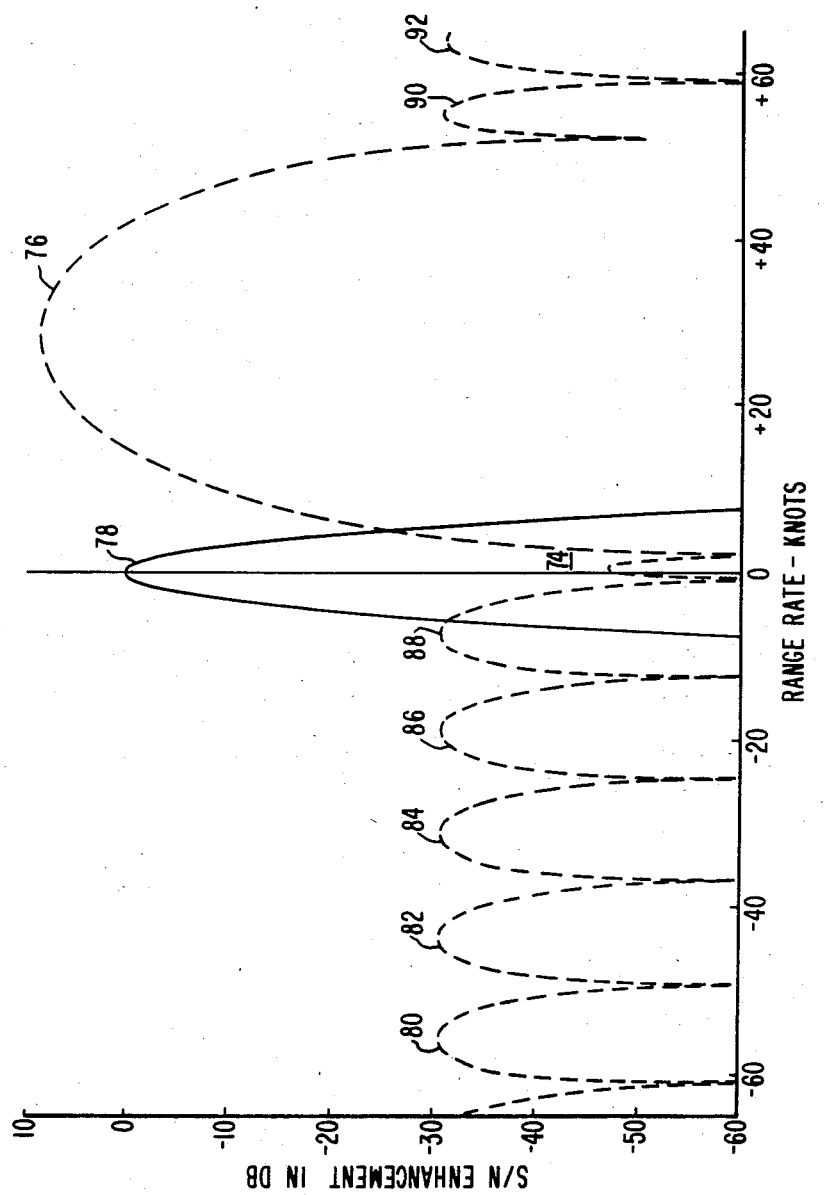
FIG. 3 is a graph depicting the response of one of the doppler filters configured for optimum moving rain clutter rejection.

The filter response shown in FIG. 3 represents a more desirable response characteristic when moderate ground clutter is present in the radar echoes along with heavy moving rain clutter. In FIG. 3, response peak 76 corresponds to the response peak 28 in FIG. 1. The notch for the ground clutter signal 78 has fewer null frequencies than the notch 60 of FIG. 2, thus the resultant ground clutter passed by the filter in FIG. 3 is more than that passed by the filter represented in FIG. 2. Consequently, the filter of FIG. 3 does not attenuate ground clutter echoes as well as the filter shown in FIG. 2. On the other hand, the response peaks 80, 82, 84, 86, 88, 90 and 92 give more attenuation in the rain clutter region than the corresponding peaks of the filter shown in Figure 2. Therefore, the filter of FIG. 3 is desirable over the filter of FIG. 2 when the echoes contain a predominant amount of moving rain clutter rather than a predominant amount of stationary ground clutter.

Although FIGS. 2 and 3 were described as representing different doppler filters, the different responses may be more easily implemented with digital filters by changing the filter weights, coefficients, or values used in the digital processor. Such a change in weights can change the overall response between that of FIGS. 2 and 3 and may effectively include the movement of zeroes in the zero-pole diagram defining the filter performance. In addition, normal practice would make the response of the negative filter of the pair a mirror image of the positive filter. Normally, switching of or selecting filters is accomplished in corresponding pairs which maintains symmetry about the zero axis of the filter bank.

FIG. 4 illustrates the general arrangement for appropriately selecting between two filter pairs depending upon which filter pair gives the better combination of reject characteristics for the clutter echoes being received. It is emphasized that more than two filter response characteristics may be available for selection in some cases or, if desired, more than one non-zero pair may be selected as opposed to just the pair nearest the zero filter pair.

According to detectors 94 and 96, the filter selector monitors the echoes and determines the mean doppler of the echoes and the amplitude of the clutter echoes. The detector processor 98 combines the outputs from the detectors 94 and 96 to decide which filter weight the controller 100 should apply to the filter pair 102. The echo means doppler detector 94 basically tells the processor 98 that the received echoes do or do not have a mean doppler shift which is within the spectrum rejected by the non-zero doppler filters. Clutter amplitude detector 96 basically tells the processor 98 whether or not the received echoes have amplitudes in excess of a predetermined value. If detector 94 detects a low mean doppler and the detector 96 detects a large amplitude, the processor knows that large ground clutter signals are being received and appropriately switches in the filter with the response shown in FIG. 2. If both conditions are not detected by the detectors 94 and 96, the processor does not change filter weights and the standard filter of FIG. 3 remains in the signal path.

FIG. 5 illustrates how the functions of the circuit shown in FIG. 4 may be implemented according to one specific embodiment of the invention. According to FIG. 5, the filter outputs 104 are applied to peak selectors 106 and 108. The filter outputs are from the current coherent processing interval (CPI) and preferably correspond to the logarithmic values of the signal amplitudes. A CPI is the period of time the filters process the pulse signals and is dependent upon the number of pulses and the pulse repetition frequency of the radar signal. Peak selector 108 provides a positive output to the subtractor 110 which is proportional to the larger of the logarithmic amplitudes of the $-0$ and $+0$ filters. Peak selector 106 provides a positive output which is proportional to the largest of the logarithmic amplitudes from any one of the non-zero doppler filters. This positive output is applied to the subtractor 110.

The subtractor 110 provides a difference signal to the comparator 114 based upon the applied peak selector signals. The difference signal from the subtractor 110 is proportional to the ratio of the echo powers from the peak selectors 106 and 108, and positive if the value from peak selector 108 is greater than the value from peak selector 106. If linear rather than logarithmic filter outputs are used, the subtractor 110 may be replaced with a divider circuit to determine the ratio of the echo powers. The comparator 114 processes the difference signal from the subtractor 110 and, if the difference exceeds a value $\Delta$, it issues an output signal to the CPI delay circuit 116 and the OR circuit 118. Because of its compatibility with the remaining circuit function, the output signal from the comparator 114 may be described in terms of logic signals. Thus, if the peak zero filter signal exceeds the peak non-zero filter signal by an amount $\Delta$, a logic 1 condition is outputted, otherwise a logic 0 condition is outputted by comparator 114.

The filter outputs 104 are from each CPI. CPI delay circuit 116 provides the delay necessary to synchronize the logic output from the mean doppler processing portion 115 of the circuit with the amplitude processing portion 117 of the circuit. The CPI delay circuit 120 and the OR circuit 118 provide an optional means for comparing signals or logic levels from the two portions or the circuit and their function is described in more detail later.

The clutter map 122 provides data on the estimated mean clutter amplitude at each range-CPI (azimuth) location based on echoes received on a multiplicity of prior scans. Data outputs may be extracted for three adjacent CPI's namely, $C_n$, $C_{n-1}$ and $C_{n-2}$. The clutter map 122 may be data in the memory of the radar digital processor derived from the zero filter·pairs. This data can be digital values corresponding directly to the outputs of the zero filters or it can be the CFAR thresholds for the CPI's, which are based on a range average of the filter outputs. For example, the clutter map data may be comprised of digital values which estimate the means level of interference at each location, averaged over eight scans. Data for three CPI's is used in this specific embodiment to assure accurate amplitude data. Using data from just one CPI can give unreliable results because of antenna skirt modulation which can cause the data at a single CPI location to not be truly representative and adjacent CPI data is needed to get accurate information on clutter amplitude.

The azimuth combiner 124 processes the three CPI inputs and produces an output proportional to the peak or highest CPI input. Other combining methods may be used without departing from the invention such as averaging the power or voltage, either weighted or unweighted, of the three inputs. Regardless of the method, the resulting output is centered around the $C_{n-1}$ coherent processing interval.

The output of the azimuth combiner 124 is applied to the comparator 126 which gives an output logic 1 if its input value exceeds the level T. The three logic inputs A, B and C are applied to the AND circuit 128 which determines if all three are at a logic 1 condition for the individual range sample or cell being tested. If so, an appropriate logic signal is transferred to the OR circuit 130 for further processing. The A input of AND circuit 128 is synchronized with the C input by delay circuit 116. Thus, both inputs correspond to $C_{n-1}$, or the prior CPI. CPI delay 120 and OR circuit 118 form an extra, and optional, input B to the AND ircuit 128. Their function is to delay the logic one additional CPI and to get a logic value for the adjacent CPI's. This may be advantageous in radars with different pulse repetition frequencies (PRF's) for adjacent CPI's. When using the optional circuitry, all three conditions need be met before AND circuit 128 produces a signal to change filters. That is, all three inputs A, B and C must be at logic 1. If the optional circuitry is not used, only inputs A and C are looked at by the AND circuit 128.

The decisions made by the AND circuit 128 are repeated for every CPI included in the azimuth sweep of the radar scan. The same decisions are made for each increment in range, or range sample. This may be on the order of every 1/16th of a nautical mile. However, changing filters that often may cause various problems, including problems with CFAR processing. Therefore, OR decision circuit 130 can be used to combine the logic levels from each discrete range sample in such a manner as to switch a filter over a larger range-azimuth cell based upon what happened at each range sample therein. Performing a strict OR function would make any sample control the filter for the entire range-azimuth cell and would be useful in reducing the effects of point clutter from a single range sample.

A further decision on whether or not to switch filters can be made by the UP-DOWN counters 132. Their function is to make it necessary to have more than one request by the previous circuitry before the counter limit is reached and the filter is switched. UP-DOWN counting with different limits may be used at different range and azimuth positions. Once the UP-DOWN counters 132 determine that a switch in filters is to be made, the appropriate signal is sent to the filter weight controller 134 which, in turn, changes the weights in the digital filter pair 136. Using UP-DOWN counters minimizes the number of false filter selections caused by a moving target producing echoes with large amplitudes. Sliding window logic can also be used with similar results as an alternative to the UP-DOWN counters 132.

Switching filters too frequently can cause problems with CFAR processing. Multiplexers 138 and 140 are used to change the threshold values applied to the comparators 114 and 126, respectively. Every time the heavy ground clutter is switched into the circuit, the multiplexers 138 and 140 function to apply new and lower values of Δ and T to the comparators. With the lower values, the decrease in mean doppler or clutter amplitude will have to be larger before the filter is switched out. This hysteresis action effectively keeps the heavy ground clutter filter in the circuit until the selecting circuit gets a strong indication that it prefers the heavy rain filter instead. When the heavy rain filter is switched into the circuit, the multiplexers are signaled to return the threshold quantities to their original values.

The filter selecting arrangements described herein decide which of the filter characteristics are preferable prior to processing echo data from the current CPI. The decision need not affect the processing of the current CPI data as it may be stored for use on the next scan.

The radar filter selector disclosed herein provides a new and useful arrangement for optimizing the information from the radar echoes. The selector allows the radar to select the filter pair which is best suited for the currently received echoes.

It is emphasized that since numerous changes may be made in the above-described system and since different embodiments of the invention may be made without departing from the spirit thereof, it is intended that all of the matter contained in the foregoing description or shown in the accompanying drawings shall be interpreted as illustrative rather than limiting.

I claim as my invention:

1. A filter arrangement for radar systems, said filter arrangement comprising:
   first filtering means for providing a first predetermined frequency response;
   second filtering means for providing a second predetermined frequency response, said second response being different than said first response;
   first means for detecting when a plurality of radar echoes from a specific spatial location have a mean doppler shift substantially equal to zero;
   second means for detecting when the radar echoes have an amplitude greater than a first predetermined value;
   means for selecting said second filtering means only if said first detecting means determines that said radar echoes have a mean doppler shift substantially equal to zero and said second detecting means determines that said radar echoes have an amplitude greater than said first predetermined value;
   wherein the first and second filtering means each comprises a bank of filters having similar passbands and wherein the first detecting means includes means for sensing the outputs of said first or second filtering means; and
   wherein the means for sensing the filtering means outputs compares the echo signal from zero filters to the peak echo signal from non-zero filters, and provides an indication of detection when zero filter echo signal exceeds the non-zero filter peak echo signal by a second predetermined value.

2. The filter arrangement of claim 1 wherein the rejection bands of the first and second filtering means are different.

3. The filter arrangement of claim 2 wherein the rejection bands of the two filtering means are such that the first filtering means provides better rain clutter rejection than the second filtering means, and the second filtering means provides better ground clutter rejection than the first filtering means.

4. The filter arrangement of claim 1 further comprising means for changing said first and second predetermined value upon selection of the second filtering means to provide a hysteresis effect upon the selection of the first filter.

5. The filter arrangement of claim 1 including means for delaying the operation of the first detecting means for one coherent processing interval.

6. The filter arrangement of claim 5 including means for making the filter selection dependent upon data in two adjacent coherent processing intervals.

7. The filter arrangement of claim 1 wherein the selecting means includes means for selecting the second filter only after analyzing outputs from the first and second detecting means over a plurality of range samples.

8. The filter arrangement of claim 1 wherein the means for selecting the second filtering means includes UP-DOWN counting means for making it necessary to have more than one output from the first and second detecting means before the second filtering means is selected.

9. The filter arrangement of claim 1 wherein the means for selecting the second filtering means includes means for changing the filter weights used by a digital processor.

10. The filter arrangement of claim 1 wherein the first and second filtering means have pass bands suitable for use as the first set of non-zero doppler filters in a doppler radar system.

11. A filter arrangement for radar systems, said filter arrangement comprising:
    first filtering means for providing a first predetermined frequency response;
    second filtering means for providing a second predetermined frequency response, said second response being different than said first response;
    first means for detecting when a plurality of radar echoes from a specific spatial location have a mean doppler shift substantially equal to zero;

second means for detecting when the radar echoes have an amplitude greater than a first predetermined value;

means for selecting said second filtering means only if said first detecting means determines that said radar echoes have a means doppler shift substantially equal to zero and said second detecting means determines that said radar echoes have an amplitude greater than said first predetermined value;

wherein the second detecting means includes means for using the data contained in a clutter map; and wherein the means for using the data in the clutter map includes means for combining the data from three adjacent coherent processing interval cells to provide a single output data value.

12. The filter arrangement of claim 11 wherein the combining means produces an output data value which is equal to the peak amplitude of the data from the three adjacent coherent processing interval cells.

13. A filter arrangement for radar systems having a plurality of zero and non-zero doppler filters, said filter arrangement comprising:

an adjustable non-zero doppler filter defined by first and second weight sets, said first weight set defining a first filter response which has better rain clutter rejection than a second filter response defined by said second weight set, and said second weight set providing the second filter response with better ground clutter rejection than said first filter response defined by the first weight set;

means for determining the peak amplitude of all non-zero doppler filter responses;

means for detecting the peak amplitude of all zero doppler filter responses;

means for providing a first output when the peak amplitude of the zero doppler filter responses exceeds the peak amplitude of the non-zero doppler filter responses by a first predetermined ratio value;

means for providing a second output equal to said first output delayed for one coherent processing interval;

means for combining at least three values of azimuth data from a clutter map, said combining means providing a third output when the combined azimuth data values exceed a second predetermined value;

means for providing a fourth output when said second and third outputs are present; and means for changing from said first weight set to said second weight set when said fourth output is present.

14. The filter arrangement of claim 13 including means for changing the first predetermined ratio value when the second filter weight set is selected.

15. The filter arrangement of claim 13 including means for changing the second predetermined value when the second filter weight set is selected.

16. The filter arrangement of claim 13 wherein the combining means combines the three azimuth data values to yield a resultant value equal to the peak amplitude of the largest of the three separate azimuth data values.

17. The filter arrangement of claim 13 wherein the fourth output is provided only after the second and third outputs are present for a plurality of range samples.

18. A method of selecting filters in a radar system, said method comprising the steps of:

receiving a plurality of radar echoes from a specific spatial location;

providing a first filtering means having a first predetermined frequency response;

providing a second filtering means having a second predetermined frequency response;

sensing output echo signals from zero and non-zero filters in said first or second filtering means;

measuring the mean doppler shift of said output echo signals;

measuring the amplitude of said output echo signals;

comparing said output echo signals from zero filters in said first or second filtering means to said output echo signals from non-zero filters in said first or second filtering means; and selecting said second filtering means only if said mean doppler shift of said output echo signals is less than a first predetermined value and said amplitude of said output echo signals from said zero filters is greater than said amplitude of said output echo signals from said non-zero filters by a second predetermined value.

19. The method of claim 18, wherein said selecting step is based on a combination of mean doppler shift and amplitude data from adjacent spatial locations.

* * * * *